United States Patent
Haynes

[15] 3,656,726
[45] Apr. 18, 1972

[54] WELDING HEAD HANGER
[72] Inventor: John R. Haynes, 2630 East 15th Place, Tulsa, Okla. 74104
[22] Filed: Oct. 10, 1969
[21] Appl. No.: 865,368

[52] U.S. Cl. .................................................. 248/124, 85/8.6
[51] Int. Cl. ............................................................ B23k 37/02
[58] Field of Search ............... 248/124, 125; 287/14; 85/8.6

[56] References Cited

UNITED STATES PATENTS

| 1,188,951 | 6/1916 | Lacenda | 248/124 |
| 1,779,204 | 10/1930 | Anderson | 85/8.6 |
| 1,815,928 | 7/1931 | Murphy | 248/125 |
| 2,060,171 | 11/1936 | Burton | 287/14 |
| 2,244,778 | 6/1941 | Honsley | 248/125 |
| 2,515,300 | 7/1950 | Haben | 248/125 |
| 3,231,228 | 1/1966 | Gershman | 248/124 |

Primary Examiner—Edward C. Allen
Attorney—Head & Johnson

[57] ABSTRACT

A welding head hanger is vertically and horizontally adjustable to properly align a welding head attached thereon with a work piece to be welded.

1 Claim, 4 Drawing Figures

INVENTOR.
JOHN R. HAYNES

BY Head & Johnson
ATTORNEYS

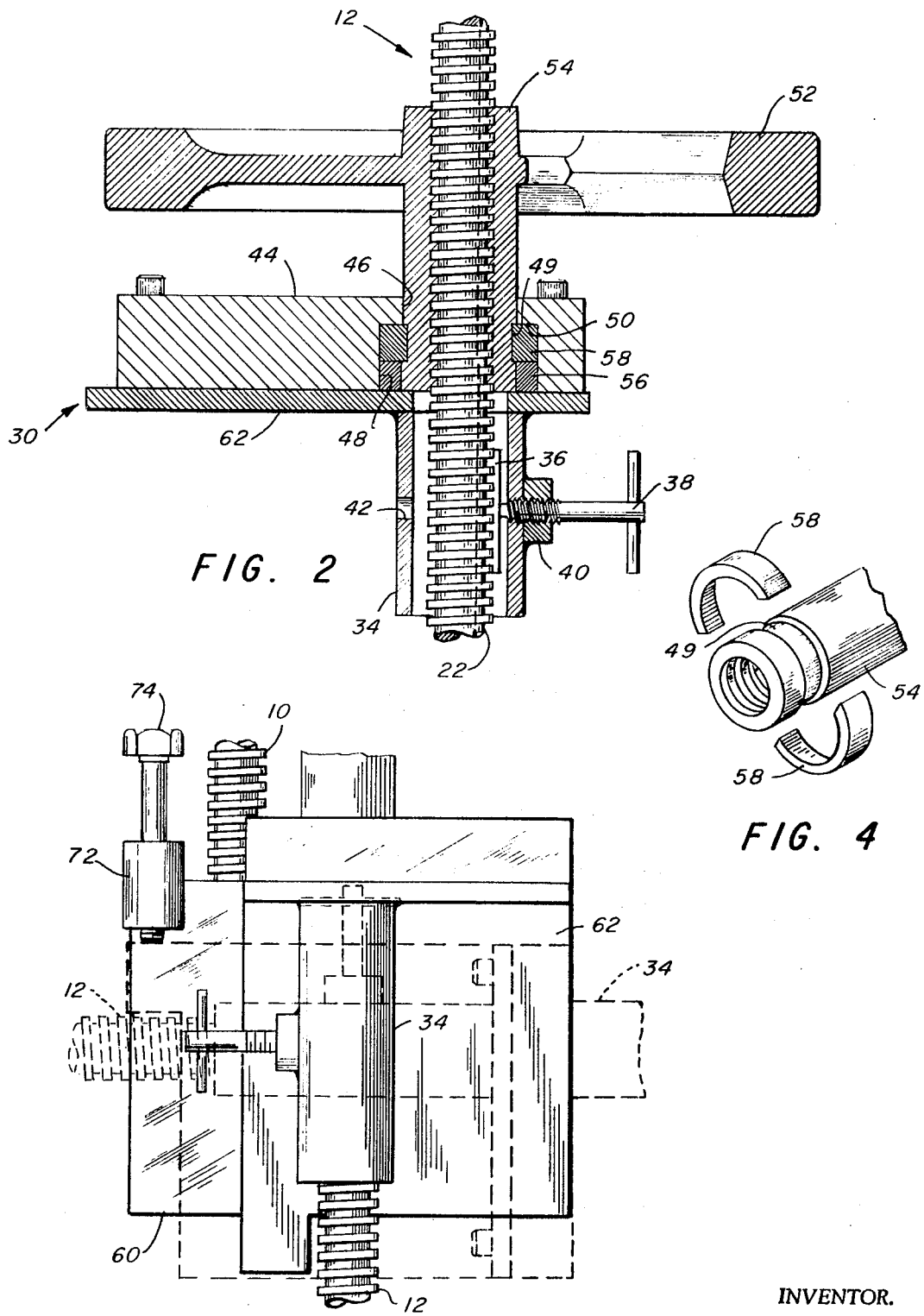

WELDING HEAD HANGER

BACKGROUND OF THE INVENTION

This invention relates to welding apparatus and more particularly to an apparatus for properly positioning and holding a welding head. In using welding torches, specifically of the continuous wire feed type where accuracy of the weld requires a non-hand-held welding head, it is necessary to properly align the tip of the welding head with the welding surface and to retain such alignment during the entire welding cycle. Accordingly, it is an object of this invention to provide a welding torch hanger which has both vertical and horizontal adjustment capabilities for properly aligning a welding head and retaining same during the welding cycle.

SUMMARY OF THE INVENTION

Generally the device consists of a first and second threaded shaft swivelably connected together by means of a travelable bracket. Vertical adjustability is attained through interaction between a first portion of the bracket and the first shaft and horizontal adjustability is attained through interaction between the second bracket portion and the second shaft. The welding head is rigidly held on one of the ends of the second shaft. When not in operation the second shaft may be swiveled upwardly into a vertical position for easy storage.

BRIEF DESCRIPTION OF THE DRAWINGS

FIG. 2 is a cross-sectional view of the apparatus taken along the line 2—2 of FIG. 1 and specifically illustrating the cooperation of the shaft, bracket and hand wheel of the invention.

FIG. 3 is a view of the apparatus taken along the line 3—3 of FIG. 1 showing in phantom the relationship between the two bracket portions when the second shaft is in the horizontal position.

FIG. 4 is a perspective view showing an annular groove in the lower end of the hub of a hand wheel which is an element of the invention and a split ring which is received in the annular groove.

DETAILED DESCRIPTION OF THE PREFERRED EMBODIMENT

Figure 1:
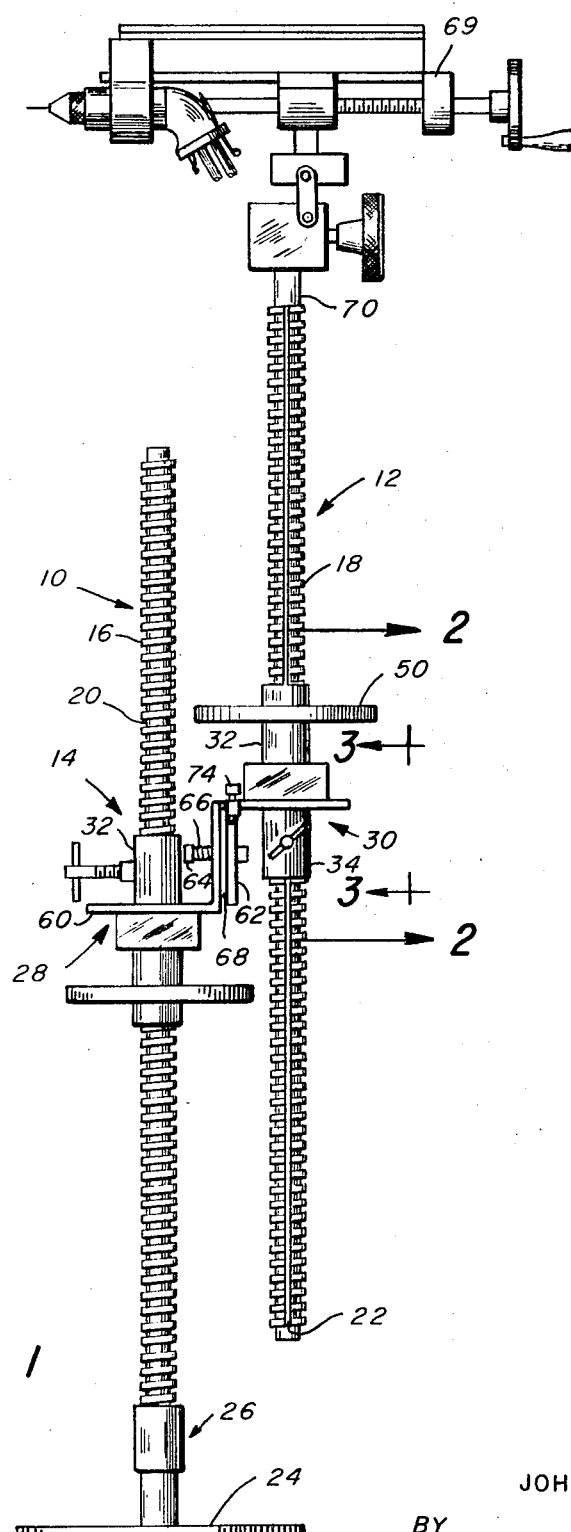
FIG. 1 is a side view of the apparatus showing the invention in the vertical position.

Looking now at FIG. 1, the apparatus includes a first shaft 10 and second shaft 12 swivelly interconnected by a bracket 14. Each of the shafts contain along the longitudinal length thereof acme threads 16 and 18 and a longitudinal square keyway 20 and 22. The shafts 10 and 12 may be fabricated from either solid rod material or hollow pipe. The lower end of the first shaft 10 is supported by a base 24 having thereon a collar 26 which captures and holds shaft 10 and from which the shaft projects vertically upwardly. The collar 26 may be a hollow cylinder with the shaft slidably inserted therein or it may contain internal threads to threadably engage acme threads 16 of shaft 10.

Turning now to the construction of mounting bracket 14, as shown in FIG. 1, the bracket has two substantially symmetrical members which are designated as 28 and 30. Each member includes a hollow tubular portion 32 and 34 having an inner diameter slightly larger than the crest diameter of acme threads 16 and 18 and which is sleeved over the respective shafts for sliding vertical movement.

In FIG. 2 member 30 is shown in cross section. It is to be understood that member 28 is similar in cross section. Internally of tubular portion 34 is an elongated key 36 received in the longitudinal keyway 22 of the shaft so as to prevent rotary movement of the bracket relative to the shaft. Threadably received in a collar 40 welded to the side of the tubular portion is a keyway moving stud 38 which is affixed to the key 36 by means of a set screw. Access to the set screw for attaching the key 36 to the key movement stud 38 is gained through an aperture 42 in the wall of the tubing diametrically opposed to collar 40.

Secured to the upper end of tubular portion 34 and containing a transverse aperture coaxial therewith is the horizontal segment of an L-shaped plate 62. A wheel block support 44 is affixed to L-shaped plate 62 by suitable bolts and has therethrough a transverse aperture 46 which is also coaxial with tubular portion 34. Concentric with aperture 46 is an annular ridge 50 provided by a borehole 48 in the face of wheel support block 44 contiguous with L-shaped plate 62.

An integral hub 54 of a hand wheel 50 passes through aperture 46 and borehole 48 and rests on the upper surface of L-shaped plate 62 from whence bearing support is received. The integral hub 54 contains female acme threads mating with the male threads of shaft 12. Interposed between the wall of the borehole and the outer diameter of hub 54 is a bearing block 56. Confined within borehole 48 between bearing block 56 and ridge 50 and contiguous therewith is a split steel ring 58, the inner periphery of which is fitted in an annular groove 49 cut into the outer wall of hub 54 and the outer periphery of which is bounded by the borehole 48. The relationship of split steel ring 58 to annular groove 49 is specifically illustrated in FIG. 4. Split steel ring 58 so disposed within borehole 48 serves to longitudinally lock hand wheel 52 with respect to wheel support block 44, that is, ring 50 prevents longitudinal movement of hand wheel 52 relative to support block 44, but does not impede rotary movement thereof. Thus rotation of hand wheel 52 so received within wheel block support 44 causes relative longitudinal movement between the shaft and the respective bracket members received thereon.

Looking now again at FIG. 1, swivel attachment of the members 28 and 30 is accomplished by L-shaped plates 60 and 62 on each bracket having one of the legs of each in confronting relationship and being connected together by a nut and bolt assembly 64. A spring 66 confined between the head of the bolt and the leg of one of the mounting plates serves to provide the proper tension on the point of swivel. Interposed between the two confronting plate sections is an electrical insulating annular pad 68 which facilitates smooth angular movement of the second shaft with respect to the first.

At one end of the shaft 12 is located means for supporting a welding head 69, such means being fabricated in one of a variety of ways. In the preferred embodiment is shown a square stud 70 projecting upwardly to engage a square aperture in the welding head assembly. The shaft may be directly connected to the welding head or there may be interposed therebetween an adjustable welding head holding means such as described in my pending application Ser. No. 725,799, filed May 1, 1968.

The welding head supporting stud 70 is covered by an electrical insulating material to prevent any electrical conductivity along the shafts of the apparatus in the event that the welding head becomes shorted.

A stop means consisting of an eyelet 72 welded to the vertical segment of L-shaped plate 60 on member 28, as seen in FIG. 3, and a threaded bolt 74 passing therethrough limit the swivelable movement of the shaft 12 relative to shaft 10 to an angular movement of 90°; that is, the shaft 12 can be swiveled only between a vertical and horizontal position. The lower end of the bolt 74 which comes in contact with shaft 12 is also electrically insulated to provide further protection from electrical conductivity through the apparatus in the event that an electrical short should occur at the welding head. Rotation of the bolt 74 allows a few degrees of adjustment in the horizontal position.

In operation the second shaft 12 and bracket member 30 are angularly moved from a vertical storage position to a horizontal position as partially shown in dotted lines in FIG. 3. The stop bolt 74 retains the shaft in the horizontal position. Rotation of the hand wheels horizontally and vertically position the welding head at the correct distance from the welding surface to obtain the weld of maximum strength and uniformity.

When the welding operation is completed the shaft 12 can again be angularly moved to a vertical storage position.

During the description of the preferred embodiment specific words have been utilized for the sake of clarity. However, it is to be understood that such words are not words of limitation and that the words include all equivalents which operate in a similar manner to obtain similar results. For example, if a hollow pipe is used for shaft 12, the welding head holding stud could be an integral part of a long extension rod which is slidably received within the interior thereof and held thereto by a set screw. Thus the second shaft would have a quickly adjustable extension therein to further increase the utility of the apparatus.

What is claimed:

1. An adjustable hanger for holding and aligning a welding head in a desired relationship with a piece to be welded comprising in combination:

a base;

a first threaded shaft affixed to said base and extending vertically upwardly therefrom, said shaft containing thereon a unitary elongated keyway along the longitudinal axis thereof;

a first bracket including a tubular portion slidably surrounding said first shaft, said tubular portion having a key engaging said keyway and means to lock said key to said shaft to inhibit movement, said bracket further including a hand wheel and hub threaded to said first shaft, a wheel block to rotatably support said hub whereby rotation of said wheel axially moves said bracket vertically;

a second threaded shaft having at one end means for receiving and holding said welding head, said shaft containing thereon a unitary elongated keyway along the longitudinal axis thereof;

a second bracket swivelly supported to said first bracket, said second bracket including a tubular portion surrounding said second shaft, said tubular portion having a key engaging said keyway and means to lock said key to said shaft to inhibit movement, said bracket further including a hand wheel and hub threaded to said second shaft, a wheel block to rotatably support said hub whereby rotation of said wheel axially moves said second shaft;

said hub of said hand wheel having an outer wall containing an annular groove within a recess in said wheel block; and means to retain said hand wheel to said wheel block comprising a steel split ring confined within said annular groove whereby longitudinal movement of said hand wheel relative to said bracket member is prohibited but rotary movement thereof is allowed.

* * * * *